US008758123B2

(12) United States Patent
Frattinger et al.

(10) Patent No.: US 8,758,123 B2
(45) Date of Patent: Jun. 24, 2014

(54) GAMING NETWORK WITH ASSOCIATED COMMUNITY/PROGRESSIVE FEATURES

(75) Inventors: Christopher J. Frattinger, Sparks, NV (US); Michael W. Mastropietro, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1457 days.

(21) Appl. No.: 12/442,503

(22) PCT Filed: Sep. 21, 2007

(86) PCT No.: PCT/US2007/020561
§ 371 (c)(1),
(2), (4) Date: Mar. 23, 2009

(87) PCT Pub. No.: WO2008/039403
PCT Pub. Date: Apr. 3, 2008

(65) Prior Publication Data

US 2010/0087256 A1 Apr. 8, 2010

Related U.S. Application Data

(60) Provisional application No. 60/846,701, filed on Sep. 22, 2006.

(51) Int. Cl.
*A63F 13/12* (2006.01)
*G07F 17/32* (2006.01)

(52) U.S. Cl.
CPC ........ *G07F 14/3244* (2013.01); *G07F 17/3272* (2013.01)
USPC ........................................................... 463/26

(58) Field of Classification Search
CPC ............ G07F 17/3223; G07F 17/3227; G07F 17/3272; G07F 13/3274; G07F 17/3276; G07F 17/3279; G07F 14/3283; G07F 17/3283; G07F 17/3244; G07F 17/3258; G07F 17/3225; G07F 17/3232; G07F 17/3434; G07F 17/3237; A63F 2300/5533; A63F 300/5546; A63F 2300/6009; A63F 2300/552; A63F 2300/5526; A63F 2300/5546; A63F 2300/55; A63F 2300/535; A63F 2300/53; A63F 2300/05; A63F 2300/209; A63F 2011/0086; A63F 3200/554; G06F 8/65; G06F 8/66; G06F 8/665; G06F 8/67; G06F 8/68; G06F 8/70; G06F 8/71; G06F 21/57
USPC ................. 463/25–28, 40–42, 16, 20, 30, 31, 463/11–13, 17–19; 717/168–176, 177, 178
See application file for complete search history.

(56) References Cited

U.S. PATENT DOCUMENTS 4,247,106 A * 1/1981 Jeffers et al. .................... 463/29
4,558,413 A * 12/1985 Schmidt et al. ............... 717/170
(Continued)

FOREIGN PATENT DOCUMENTS

AU 5251830 12/2005 .............. A63F 13/12
WO WO 2005/120672 12/2005 .............. A63F 13/12
(Continued)

*Primary Examiner* — David L Lewis
*Assistant Examiner* — Matthew D Hoel
(74) *Attorney, Agent, or Firm* — Nixon Peabody LLP

(57) ABSTRACT

A system and method are disclosed for operating a gaming machine on a gaming network is disclosed. The gaming machine allows playing a wagering game and includes a storage device to store an instruction set for the wagering game. The wagering game includes a randomly selected outcome selected from a plurality of outcomes in response to receiving a wager input from a player. An interface is coupled to the storage device and is capable of communication with the network to receive at least a part of the instruction set for the wagering game from the network. The wagering game provides access to a community event over the network.

18 Claims, 8 Drawing Sheets

(56) References Cited

U.S. PATENT DOCUMENTS

| | | | | |
|---|---|---|---|---|
| 4,837,728 | A | 6/1989 | Barrie et al. | 364/412 |
| 5,051,822 | A * | 9/1991 | Rhoades | 463/25 |
| 5,083,271 | A | 1/1992 | Thacher et al. | 700/92 |
| 5,116,055 | A | 5/1992 | Tracy | 273/138 |
| 5,249,800 | A * | 10/1993 | Hilgendorf et al. | 463/27 |
| 5,377,973 | A * | 1/1995 | Jones et al. | 463/12 |
| 5,632,681 | A * | 5/1997 | Bakoglu et al. | 463/44 |
| 5,634,848 | A * | 6/1997 | Tsuda et al. | 463/25 |
| 5,655,961 | A | 8/1997 | Acres et al. | 463/27 |
| 5,761,649 | A | 6/1998 | Hill | 705/27 |
| 5,809,251 | A * | 9/1998 | May et al. | 709/223 |
| 5,851,149 | A | 12/1998 | Xidos et al. | 463/42 |
| 5,885,158 | A | 3/1999 | Torango et al. | 463/27 |
| 5,923,885 | A * | 7/1999 | Johnson et al. | 717/176 |
| 5,941,773 | A * | 8/1999 | Harlick | 463/26 |
| 5,974,454 | A * | 10/1999 | Apfel et al. | 709/221 |
| 6,319,125 | B1 * | 11/2001 | Acres | 463/25 |
| RE37,885 | E | 10/2002 | Acres et al. | 463/42 |
| 6,645,077 | B2 * | 11/2003 | Rowe | 463/42 |
| 6,648,762 | B2 * | 11/2003 | Walker et al. | 463/25 |
| RE38,812 | E | 10/2005 | Acres et al. | 463/26 |
| 7,040,987 | B2 * | 5/2006 | Walker et al. | 463/42 |
| 7,056,215 | B1 * | 6/2006 | Olive | 463/27 |
| 7,131,909 | B2 * | 11/2006 | Rowe | 463/42 |
| 7,144,321 | B2 | 12/2006 | Mayeroff | 463/16 |
| 7,186,181 | B2 * | 3/2007 | Rowe | 463/42 |
| 7,285,049 | B1 | 10/2007 | Luciano, Jr. et al. | 463/42 |
| 7,465,231 | B2 * | 12/2008 | Lewin et al. | 463/37 |
| 7,568,973 | B2 | 8/2009 | Iddings et al. | 463/25 |
| 7,578,740 | B2 | 8/2009 | Marks et al. | 463/27 |
| 7,611,405 | B2 | 11/2009 | Wolf et al. | 463/20 |
| 7,666,093 | B2 | 2/2010 | Lafky et al. | 463/26 |
| 7,677,971 | B2 | 3/2010 | Baerlocher et al. | 463/27 |
| 7,682,248 | B2 | 3/2010 | Baerlocher et al. | 463/27 |
| 7,780,520 | B2 | 8/2010 | Baerlocher | 463/25 |
| 7,862,427 | B2 | 1/2011 | Nguyen et al. | 463/27 |
| 7,905,778 | B2 | 3/2011 | Breckner et al. | 463/26 |
| 7,908,486 | B2 | 3/2011 | Gatto et al. | 713/189 |
| 7,914,377 | B2 | 3/2011 | Benbrahim et al. | 463/25 |
| 7,980,947 | B2 | 7/2011 | Michaelson et al. | 463/27 |
| 8,070,597 | B2 | 12/2011 | Cuddy | 463/27 |
| 8,162,755 | B2 * | 4/2012 | Brosnan et al. | 463/42 |
| 2005/0064930 | A1 | 3/2005 | Jubinville et al. | 463/17 |
| 2005/0119047 | A1 * | 6/2005 | Olive | 463/27 |
| 2005/0176488 | A1 * | 8/2005 | Olive | 463/16 |
| 2005/0215311 | A1 | 9/2005 | Hornik et al. | 463/20 |
| 2005/0282609 | A1 * | 12/2005 | Olive | 463/16 |
| 2006/0073887 | A1 | 4/2006 | Nguyen et al. | 463/27 |
| 2006/0073888 | A1 | 4/2006 | Nguyen et al. | 463/27 |
| 2006/0073897 | A1 | 4/2006 | Englman et al. | 463/42 |
| 2006/0142079 | A1 | 6/2006 | Ikehara et al. | 463/27 |
| 2006/0148558 | A1 * | 7/2006 | Olive | 463/25 |
| 2007/0060314 | A1 | 3/2007 | Baerlocher et al. | 463/25 |
| 2007/0060321 | A1 | 3/2007 | Vasquez et al. | 463/27 |
| 2007/0191088 | A1 | 8/2007 | Breckner et al. | 463/27 |
| 2007/0218975 | A1 | 9/2007 | Iddings et al. | 463/25 |
| 2007/0259709 | A1 | 11/2007 | Kelly et al. | 463/20 |
| 2007/0293293 | A1 | 12/2007 | Baerlocher et al. | 463/16 |
| 2007/0298857 | A1 | 12/2007 | Schlottmann et al. | 463/16 |
| 2007/0298874 | A1 | 12/2007 | Baerlocher et al. | 463/27 |
| 2007/0298875 | A1 | 12/2007 | Baerlocher et al. | 463/27 |
| 2008/0020830 | A1 | 1/2008 | Ikehara et al. | 463/27 |
| 2008/0020831 | A1 | 1/2008 | Ikehara et al. | 463/27 |
| 2008/0020832 | A1 | 1/2008 | Iddings et al. | 463/27 |
| 2008/0020833 | A1 | 1/2008 | Baerlocher et al. | 463/27 |
| 2008/0020834 | A1 | 1/2008 | Breckner et al. | 463/27 |
| 2008/0020846 | A1 | 1/2008 | Vasquez et al. | 463/42 |
| 2008/0045344 | A1 | 2/2008 | Schlottmann et al. | 463/42 |
| 2008/0064502 | A1 | 3/2008 | Schlottmann et al. | 463/42 |
| 2008/0070680 | A1 | 3/2008 | Baerlocher et al. | 463/27 |
| 2008/0070692 | A1 | 3/2008 | Schlottmann et al. | 463/42 |
| 2008/0070693 | A1 | 3/2008 | Schlottmann et al. | 463/42 |
| 2008/0070694 | A1 | 3/2008 | Schlottmann et al. | 463/42 |
| 2008/0070695 | A1 | 3/2008 | Baerlocher et al. | 463/42 |
| 2008/0076514 | A1 | 3/2008 | Baerlocher et al. | 463/20 |
| 2008/0076515 | A1 | 3/2008 | Baerlocher et al. | 463/20 |
| 2008/0076517 | A1 | 3/2008 | Baerlocher et al. | 463/20 |
| 2008/0076552 | A1 | 3/2008 | Baerlocher et al. | 463/31 |
| 2008/0234036 | A1 | 9/2008 | Reddicks et al. | 463/25 |
| 2009/0124362 | A1 | 5/2009 | Cuddy et al. | 463/27 |
| 2009/0124363 | A1 | 5/2009 | Baerlocher et al. | 463/27 |
| 2009/0124364 | A1 | 5/2009 | Cuddy et al. | 463/27 |
| 2009/0291752 | A1 | 11/2009 | Anderson et al. | 463/25 |
| 2009/0305776 | A1 | 12/2009 | Englman et al. | 463/25 |
| 2010/0029369 | A1 | 2/2010 | Pacey | 463/20 |
| 2010/0048283 | A1 | 2/2010 | Anderson et al. | 463/20 |
| 2010/0048293 | A1 | 2/2010 | Hornik | 463/25 |
| 2010/0062841 | A1 | 3/2010 | Englman et al. | 463/25 |

FOREIGN PATENT DOCUMENTS

| | | | |
|---|---|---|---|
| WO | WO 2006/076185 A2 | 7/2006 | A63F 13/00 |
| WO | WO 2008/030904 | 3/2008 | G06F 17/00 |

* cited by examiner

GAMING NETWORK WITH ASSOCIATED COMMUNITY/PROGRESSIVE FEATURES

CROSS REFERENCE TO RELATED APPLICATIONS

This application is a U.S. national stage of International Application No. PCT/US2007/020561, filed Sep. 21, 2007, which is related to and claims priority to U.S. Provisional Application No. 60/846,701, filed Sep. 22, 2006, each of which is incorporated herein its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to wagering games having community event features and to different ways of distributing such wagering games.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon either a "mystery" event independent of an outcome displayed in the basic game or a "start-bonus" event dependent upon the occurrence of a selected event or outcome in the basic game. Generally, bonus games provide a greater expectation of winning than the basic game and may also be accompanied with more attractive or unusual video displays and/or audio. Because the bonus game concept offers tremendous advantages in player appeal and excitement relative to other known games, and because such games are attractive to both players and operators, there is a continuing need to develop gaming machines with new types of bonus games to satisfy the demands of players and operators.

Another concept that has been employed is the use of a progressive jackpot. In the gaming industry, a "progressive game" involves collecting coin-in data from participating gaming machines (e.g., slot machines), contributing a percentage of the coin-in to a jackpot amount, and awarding that jackpot amount to a player upon the occurrence of a certain jackpot-won event. The percentage of the coin-in is determined prior to any result being achieved and is independent of any result. A jackpot-won event may be a "mystery" event independent of an outcome displayed at a participating gaming machine, or may occur when a "progressive winning position" is achieved at a participating gaming machine. If the gaming machine is a slot machine, a progressive winning position may, for example, correspond to alignment of progressive jackpot reel symbols along a certain payline. The initial progressive jackpot is a predetermined minimum startup or "reset" amount. That jackpot amount, however, progressively increases as players continue to play the participating gaming machines without winning the jackpot. Further, when several gaming machines are linked together such that several players at several gaming machines compete for the same jackpot, the jackpot progressively increases at a much faster rate, leading to even greater player excitement.

In existing gaming terminals, the basic game remains the same and thus players over time often lose interest in the same game and thus seek other entertainment. Due to the progressive gaming features of present games the gaming terminal must remain fixed in its capabilities. Thus, operators must continually replace gaming terminals with new gaming terminals running different games having different themes, settings, bonuses etc. in order to maintain player interest. Such replacement is expensive and time consuming.

Another solution which has been used is to distribute wagering game content to existing game terminals. Wagering game machine operators now manually deliver the content to an existing game machine by replacing existing media, such as the ROM, flash RAM or CD-ROM with new media containing updated game content. However, for casinos owning many gaming machines, this process is still laborious and expensive.

Gaming machines may be configured to operate as "stand-alone" units (that may or may not be coupled to a backroom computer) where the outcome of game play is "locally determined." Gaming machines may also be configured as part of a server-based gaming network where the outcome of game play may be either locally determined or "centrally determined." For example, a gaming machine located in a bar, a convenience store, a riverboat, or an airplane, may operate as a stand-alone unit, while a gaming machine located in a traditional casino may operate as part of a server-based gaming network within the casino.

The server-based gaming networks typically include a number of gaming terminals, communicatively coupled via a dedicated (i.e., non-public) communication network to one or more server(s). Because of their versatility, server-based gaming networks enable a casino to augment the traditional "basic" game play with enhancements such as progressives, community bonus games, tournaments, etc. Server-based gaming network configurations also enable access to all types of gaming terminal data including performance data, player tracking data, accounting data, security data, and maintenance data, to name a few.

In cases where a gaming proprietor owns multiple casinos distributed over a large geographical area, individual casinos may be linked together via a large dedicated communication network. In addition, one or more servers in an individual casino may be communicatively coupled via the dedicated communication network to one or more remote database servers, thereby enabling the gaming proprietor to gather gaming data and operate and maintain the gaming network at one convenient location.

Accordingly, what is needed is a gaming machine that may be updated to provide new game content with community event features. Another need is for a gaming system which offers different games having eligibility for community events according to player demand. Another need exists for a gaming system which offers community events which are linked to gaming machines independent from game mechanics. Yet another need is for a gaming system which allows different games offering community based events to be loaded onto gaming machines.

SUMMARY OF THE INVENTION

One example of the present invention is a gaming machine for playing a wagering game. The gaming machine includes a storage device to store an instruction set for the wagering game. The wagering game includes a randomly selected outcome selected from a plurality of outcomes in response to receiving a wager input from a player. An interface is coupled to the storage device and is capable of communication with a network to receive at least a part of the instruction set for the wagering game from the network. The wagering game provides access to a community event over the network.

Another example is a method of distributing an instruction set for a wagering game to a gaming machine. The wagering game includes a randomly selected outcome selected from a plurality of outcomes in response to receiving a wager input from a player. The method includes storing at least part of the instruction set for the wagering game on a network. The wagering game provides a player with access to a community event. The gaming machine is coupled to the network. At least part of the instruction set for the wagering game is loaded onto the gaming machine.

Another example is a gaming system for playing wagering games and providing access to a community event. The gaming system includes a network having a storage device to store at least a part of an instruction set for a wagering game that provides a player with access to the community event. A gaming machine is coupled to the network and receives the at least part of the instruction set for the wagering game. The gaming machine allows a player to operate the wagering game.

Another example is a gaming machine having a storage device to store an instruction set for a wagering game. A controller is coupled to the storage device. The controller detects the use of the gaming machine by a player. An interface is coupled to the storage device. The interface allows the receipt of at least a part of the instruction set for the wagering game having a plurality of outcomes from a network. A community event is provided to the player as a function of the use of the gaming machine and independent of the wagering game played at the gaming machine.

Another example is a gaming system having a server with a storage device storing an instruction set for a wagering game. A gaming machine is coupled to the server. The gaming machine provides access to a community event. An interface is coupled to the gaming machine to allow at a least part of the instruction set for the wagering game to be loaded on the gaming machine from a network. The access to the community event is determined by use of the gaming machine independent of the wagering game played at the gaming machine.

The above summary of the present invention is not intended to represent each embodiment, or every aspect, of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings, wherein.

Figure 1A:
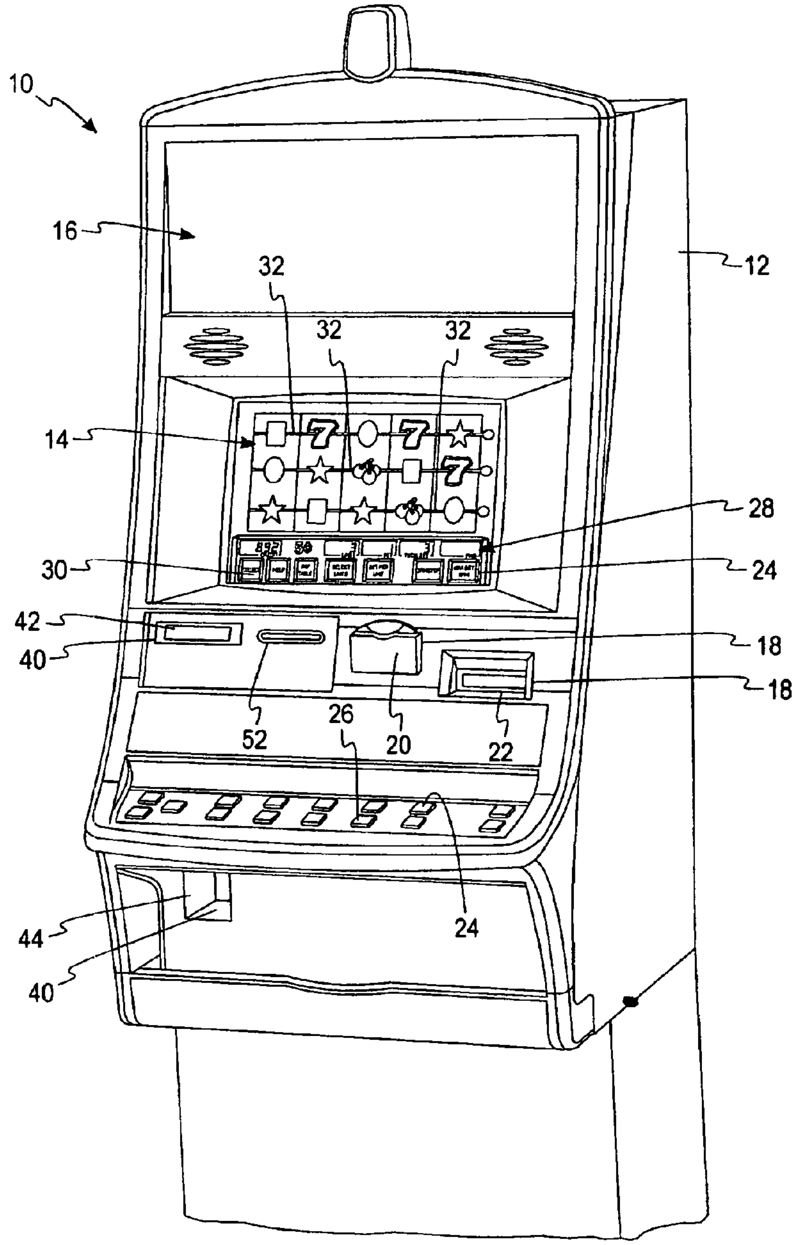
FIG. 1*a* illustrates a perspective view of an example gaming machine.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine primarily dedicated to playing wagering games and may have varying structures and methods of operation. For example, the gaming machine 10 may be an electromechanical gaming machine configured to play mechanical slots, or it may be an electronic gaming machine configured to play a video casino game, such as blackjack, slots, keno, poker, roulette, etc.

The gaming machine 10 comprises a housing 12 and includes input devices such as a value input device 18 and a player input device 24. For output the gaming machine 10 includes a primary display 14 for displaying information about the basic wagering game. The primary display 14 may also display information about a bonus wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or the secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session. As will be explained below, casinos may keep track of which games players prefer and configure the gaming machine 10 to offer those games from a menu on the primary display 14 or the secondary display 16 when players insert their cards into the player information reader 52.

Figure 1B:
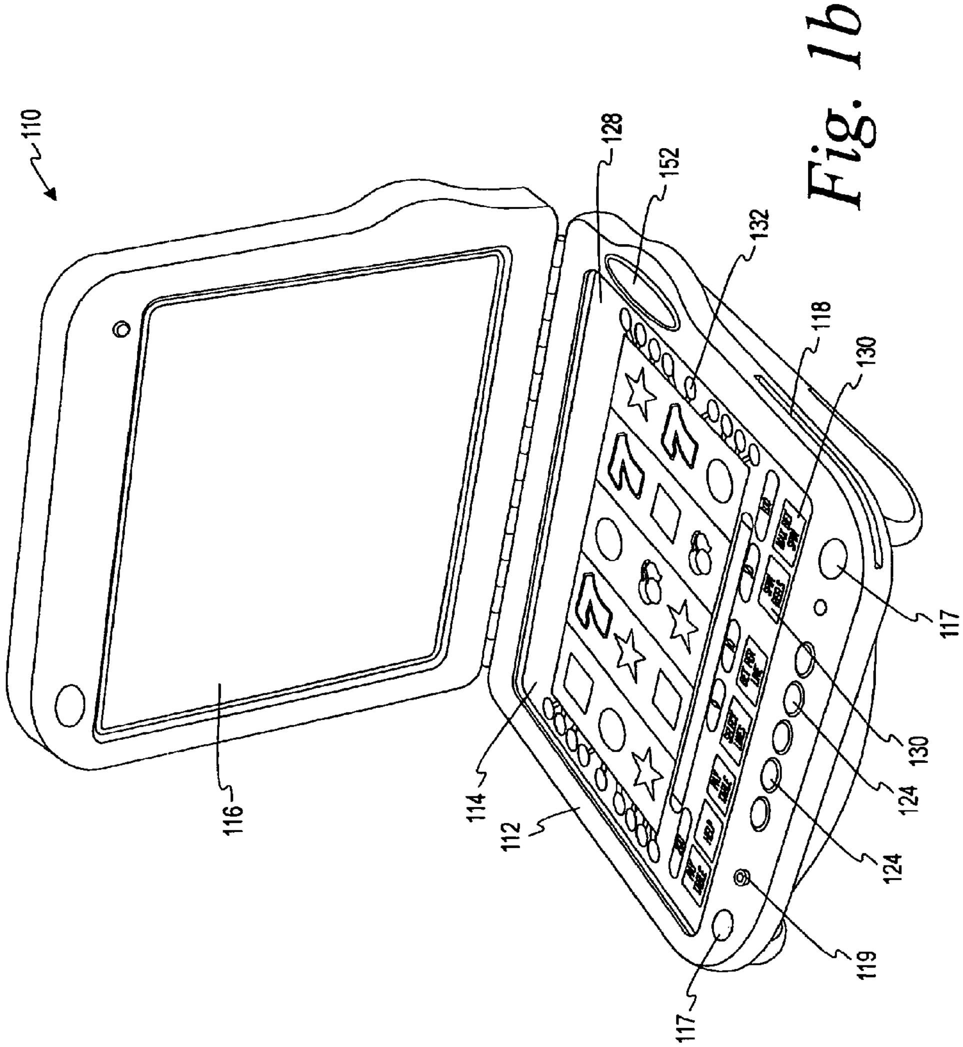
FIG. 1*b* illustrates a perspective view of an example portable gaming machine.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, community wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2"-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
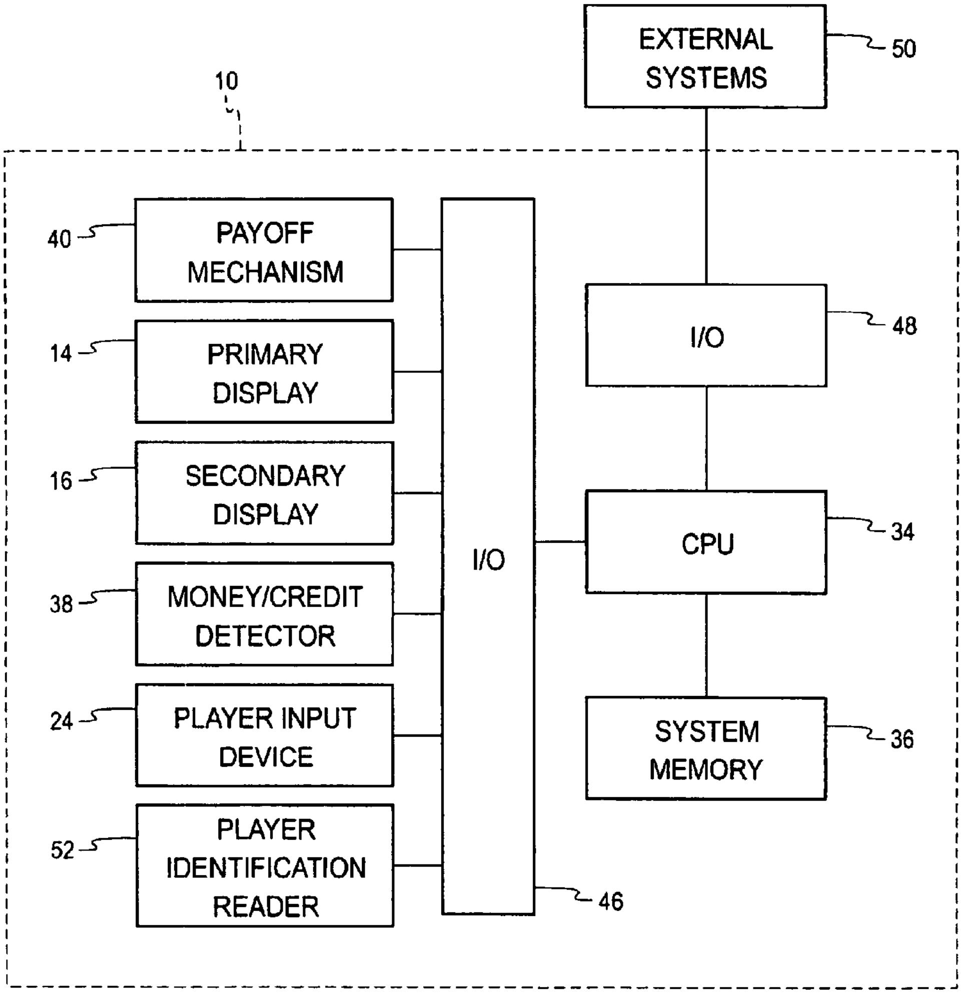
FIG. 2 illustrates a block diagram of the gaming machine of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game program instruction sets stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits. The gaming machine 10 may have multiple external ports as part of the external I/O circuits 48, each port dedicated to providing data to a specific host computer system that performs a specific function (e.g., accounting, player-tracking, or a progressive game control system, etc). These ports may take the form of one or more custom interface boards mounted in the gaming machine 10. The ports may also take the form of, for example, network interface cards designed to establish an Ethernet connection from the gaming machine 10 to the external systems 50.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10 and 110 may communicate with external systems 50 (in a wired or wireless manner) such that each machine operates as a "thin client," having relatively less functionality, a "thick client," having relatively more functionality, or through any range of functionality therebetween. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaining machine as may be necessary for particular applications. It should be understood that the gaming machines 10 and 110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
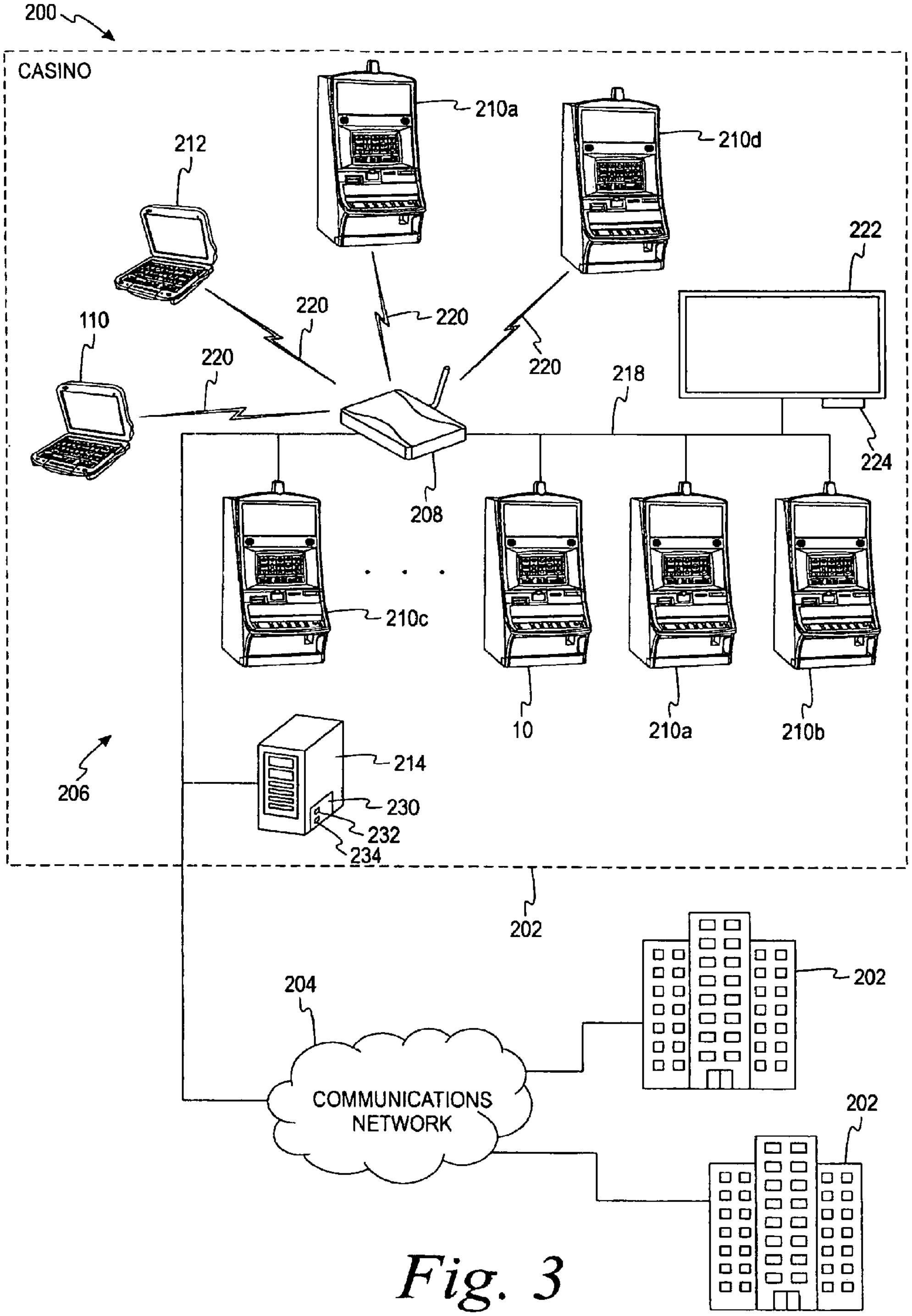
FIG. 3 is a block diagram of an example server-based gaming system.

FIG. 3 is a block diagram of an example wagering game network 200 which may include a plurality of gaming establishments such as casinos 202 connected to a communications network 204. As those of ordinary skill in the art will appreciate, the communications network 204 may be for example the Internet, or an Intranet with appropriate security mechanisms. The wagering game network 200 may include other network devices, such as accounting servers, wide area progressive servers, player tracking servers, and/or other devices suitable for use in connection with gaming terminals.

Each of the plurality of casinos 202 in this example includes a local area network 206. The local area network 206 may include a wireless access point 208 and gaming machines 10 and 110. Other game machines in the local area network 206 include stand alone gaming machines 210*a*, 210*b*; 210*c*, 210*d* and 210*e* that may be similar to the gaming machine 10 and a handheld gaming machine 212 that may be similar to the handheld gaming machine 110. A wagering game server 214 may serve wagering games on the gaming machines over the local area network 206 and function as a remote controller as described above. The wagering game server 214 includes hardware and machine readable media including instructions for performing the operations described herein. Those of ordinary skill in the art will appreciate that each casino 202 may include other local area networks such as the local area network 206 which may serve to connect many other wagering games. Alternatively, multiple servers may be used for the functions of the wagering game server 214. The local area network 206 may be any type of suitable property LAN configuration including, for example, a dedicated hardwired property LAN or a wireless property LAN. The local area network 206 may be configured in a bus topology, a star topology, a ring topology, a tree topology, a full or partial mesh topology, etc., and may therefore include a single customer network data link or multiple customer network data links. The local area network 206 may also be a peer-to-peer network in which case one or more of the controllers of the game machines perform some or all of the functions of the server 214.

The local area network 206 includes wired communication links 218 and wireless communication links 220. In this example, the stand alone gaming machines 10, 210*a*, 210*b* and 210*c* communicate with the network 206 via the wired communication links 218. The stand alone gaming machines 210*d* and 210*e* as well as the handheld gaming machines 110 and 212 communicate with the network 206 via the wireless communication links 220. Of course other combinations of wired and wireless connections to different gaming machines may be used. The wired and wireless communication links 218 and 220 may employ any suitable connection protocols such as Bluetooth, IEEE 802.11, Ethernet, public switched telephone networks, SONET, etc. The game server 214 may also serve wagering game devices and/or distribute content to devices located in other casinos 202 or at other locations on the communications network 204. As will be explained below, the local area network 206 may be configured to enable downloading of instruction sets (software) for games, game configuration data, game outcomes, etc. from the central server(s) such as the server 214 to the gaming machines, and to enable uploading of marketing and operations data from the gaming terminals to the central server, in one embodiment.

In this example, the wireless access point 208 and gaming machines such as the gaming machine 110 may communicate orthogonal frequency division multiplexed (OFDM) communication signals over a multicarrier communication channel. The multicarrier communication channel may be within a predetermined frequency spectrum and may comprise a plurality of orthogonal subcarriers. In some examples, the multicarrier signals may be defined by closely spaced OFDM subcarriers. Each subcarrier may have a null at substantially a center frequency of the other subcarriers and/or each subcarrier may have an integer number of cycles within a symbol period. For example, the wireless access point 208 and the gaming machines may communicate in accordance with a broadband multiple access technique, such as orthogonal frequency division multiple access (OFDMA). Alternatively, the wireless access point 208 and the gaming machines may communicate using spread spectrum signals.

The wireless access point 208 may be part of a communication station, such as a wireless local area network (WLAN) communication station including a Wireless Fidelity (WiFi), or a WLAN access point (AP). In such systems, the gaming machines such as gaming machine 110 may be part of a mobile station, such as a WLAN mobile station or a WiFi mobile station. Alternatively, the wireless access point 208 may be part of a broadband wireless access (BWA) network communication station, such as a Worldwide Interoperability for Microwave Access (WiMax) communication station, as the wireless access point 208 may be part of almost any wireless communication device. In such examples, the gaming machines may be part of a BWA network communication station, such as a WiMax communication station.

In this example, the frequency spectrums of the communication signals transmitted and received by the wireless access point 208 and the gaming machines may either be a 5 gigahertz (GHz) frequency spectrum or a 2.4 GHz frequency spectrum. In these examples, the 5 GHz frequency spectrum may include frequencies ranging from approximately 4.9 to 5.9 GHz, and the 2.4 GHz spectrum may include frequencies ranging from approximately 2.3 to 2.5 GHz, but other frequency spectrums are also equally suitable. In some BWA networks, the frequency spectrum for the communication signals may includes frequencies between 2 and 11 GHz.

The wireless access point 208 and the gaming machines may also communicate RF signals in accordance with specific communications standards, such as the Institute of Electrical and Electronics Engineers (IEEE) standards including IEEE 802.11(a), 80211(b), 802.11(g), 802.11(h) and/or 802.11(n) standards and/or proposed specifications for wireless local area networks, but they may also be suitable to transmit and/or receive communications in accordance with other techniques and standards. For example, in BWA networks, the wireless access point 208 and the gaming machines RF signals in accordance with the IEEE 802.16-2004 and IEEE 802.16(e) standards for wireless metropolitan area networks (WMANs) including variations and evolutions thereof. However, they can also be suitable to transmit and/or receive communications in accordance with other techniques and standards.

The wireless access point 208 and the gaming machines may include one or more antennas (not shown). These antennas may include directional or omnidirectional antennas, including, for example, dipole antennas, monopole antennas, patch antennas, loop antennas, microstrip antennas or other types of antennas suitable for transmission of the RF signals. In some multiple input, multiple output configurations, two or more antennas may be used. Alternatively, a single antenna with multiple apertures may be used. In multiple aperture configurations, each aperture may be considered a separate antenna. In some multi-antenna configurations, each antenna may be effectively separated to take advantage of spatial diversity and the different channel characteristics that may result between each of the antennas and another wireless communication device. In some multi-antenna configurations, the antennas of a device may be separated by up to 1/10 of a wavelength or more.

Handoffs between different wireless access point such as the wireless access point 208 and one of the gaming machines such as the gaming machine 110 may be performed on a signal-to-noise ratio (SNR), a signal-to-noise and interference ration (SNIR), a bit-error rate (BER), or an energy per received bit.

It is to be understood that the wireless access point 208 and the gaming machines may communicate in accordance with standards such as the Pan-European mobile system standard referred to as the Global System for Mobile Communications (GSM). Alternatively, the wireless access point 208 and the gaming machines may also communicate in accordance with packet radio services such as the General Packet Radio Service (GPRS) packet data communication service. The access point 208 may also communicate with the gaming machines in accordance with the Universal mobile Telephone System (UMTS) for the next generation of GSM, which may, for example, implement communication techniques in accordance with 2.5G and third generation (3G) wireless standards. The wireless access point 208 and the gaming machines may provide packet data services (PDS) using packet data protocols (PDP). The wireless access point 208 and the gaming machines may communicate in accordance with other standards or other air interfaces including interfaces compatible with the enhanced data for GSM evolution (EDGE) standards.

The wireless access point 208 and the gaming machines may also communicate in accordance with a short range wireless standard, such as the Bluetooth™ short range digital communication protocol. Bluetooth™ wireless technology is a de facto standard, as well as a specification for small-form factor, low cost, short range radio links between mobile computers, mobile phones and other portable devices. Alternatively, the wireless access point 208 and the gaming machines may communicate in accordance with an ultra-wideband (UWB) communications technique where a carrier frequency is not used. The wireless access point 208 and the gaming machines may also communicate in accordance with an analog communication technique, in accordance with an optical communication technique such as the Infrared Data Association (IrDA) standard, or the Home-RF standard such as in accordance with a Home-RF Working Group (HRFWG) standard.

The server 214 may be any computer capable of executing programs or instruction sets for controlling slot machines and other types of gaming machines. In such embodiments, the gaming machines 10, 100, 210*a-e* and 212 may each be a simple input/output terminal with regard to the functions controlled by the server 212. For example, the random selection of outcomes for the basic game and the bonus game may be functions performed by the server 214 and subsequently provided to a gaming machine such as the gaming machine 10. Functions that are not provided by the server 214, such as control of the local lights, sounds, and displays of the gaming machine, are handled by the local CPU such as the controller 34 in FIG. 2.

An additional central display such as a video monitor 222 may be coupled to the local area network 206 which is viewable from the player of a number of gaming machines such as gaming machines 10, 100, 210*a-e* and 212 for display of video or graphics relating to community based events accessible from games on the gaming machines. For example, the video monitor 222 may be used to show a current progressive jackpot or jackpots which players playing different gaming machines may be eligible to win. The video monitor 222 can include dual-sided plasma displays, mechanical dice, and/or other devices designed to attract potential players to the gaming machines.

In the present example, one community event offered by the basic game stored in the system memory 36 (FIG. 2) of the gaming machine 10 is a game having a progressive award or jackpot, which is preferably linked with other gaming machines via the local area network 206 and/or the network 204. The entire progressive award or jackpot may be won upon the occurrence of a certain outcome of the game.

The server 214 may also operate one or more progressive awards concurrently with the basic game and/or bonus games. As explained above, such progressive awards are usually funded by appropriating a percentage of the coin-in from participating gaming machines. To be eligible to win the progressive award, the player may be required to make a progressive award side wager or make a wager satisfying predetermined criteria, e.g., a maximum wager or a wager covering all available paylines in the basic game. Then, upon occurrence of jackpot-won event in the form of either a "mystery" event or one or more predetermined outcomes in the basic game and/or bonus game, the player is awarded the progressive jackpot in addition to any regular prize or award resulting from the basic game and/or bonus game. The jackpot-won event may, for example, be the appearance of a predetermined scatter symbol during the basic game.

Progressive jackpots may be divided into multiple levels such as two, three, four, or more levels. Each jackpot level may be associated with different groups of participating gaming machines that contribute to that jackpot level. For example, the highest jackpot level may be a wide-area progressive (WAP) associated with gaming machines across multiple casinos, while the remaining jackpot levels may be local-area progressives (LAPs) associated with gaming machines at a single casino or bank of machines with the casino. The particular game operated by the server 214 illustrated in FIG. 3 is a local-area progressive in which the video monitor 222 is controlled by the network server 214 and may continuously display the progressive jackpot amount(s), preferably on both individual displays of the participating gaming machines and community displays in proximity to the participating machines such as the video monitor 222 where players in the casino 202 may easily see the jackpot amount (s). A basic game menu may include several options for a player, including picking games, progressive options, and side bet options.

Other community events may include a community bonus game, a bonus prize shared by multiple players, a multiplier award or other community features. Such a community event may interrupt the game play on the gaming machine 10 and use other mechanisms such as the video monitor 222 in FIG. 3 to show graphics or video relating to the community event. In this example, each one of the players who are currently playing wagering games on the gaming machines participates in the community event according to an eligibility criteria such as time-based eligibility that each gaming machine determines locally. In this example, a community event controller 224 associated with the video monitor 222 continuously runs a process to determine if the community bonus should occur, using its random number generator (RNG). For example, every 250 milliseconds, the RNG in the community event controller 224 determines if the community event is triggered. If the community event controller 224 determines that the community event should occur, then it will issue an invitation to the gaming machines. Because each of the wagering games on the gaming machines keeps track of the current eligibility of the respective games being played, each of the gaming machines makes a decision whether it will allow the player to participate in the community event, and at which multiplier any bonuses or prizes resulting from the community event will be awarded to the player. It is to be understood that a server such as the server 214 or a master machine which may be one of the gaming machines such as the gaming machine 10 may be used for the community event controller 224.

The server 214 includes a storage device 230 that contains software instruction sets for different wagering games which may be loaded onto a storage device of gaming machines such as the system memory 36 of the gaming machine 10. It is to be understood that different parts of the instructions sets may be stored on the storage device 230 with other parts of the instruction sets stored on the individual gaming machines. For example, the gaming machines may store part of the instruction sets in the form of modules relating to graphics files, audio/sound files, and certain game functions and operations such as player greetings or instructions. The stored instructions sets are mated with the remainder of the instruction sets loaded from the storage device 230 over the network 206.

Part or all of the software instruction set for wagering games may be sent to the various gaming machines via the wired communication links 218 or the wireless communication links 220. The wagering games are received by the external I/O circuit 48. The controller 34 of the gaming machine loads the instruction set for the new wagering game or games in the system memory 36 and runs the wagering game in accordance with the software instructions. The wagering games may be stand alone or may offer eligibility or access to progressive awards or support other community events with other gaming machines on the local area network 206 or bigger networks such as the wagering game network 204 in FIG. 3. The progressive awards therefore may not be associated with any particular basic game, rather the awards are common to all basic games which may be run by some or all of the gaming machines on the local area network 206. In the interest of fairness, the expected value of winning the progressive award is equivalent between games which allow eligibility to the progressive award. The expected value for all such games is equalized by setting the odds for winning the progressive award in proportion to the amount wagered. Alternatively, the same wager at the same odds to win the progressive award may be used for all participating games.

In this example, the wagering games loaded from the server 214 offer access to symbol-based progressive awards and are preferably correlated so that their respective expected values for the progressive award are the same and thus may be loaded on any gaming machine which contributes to the progressive award. Thus, different games may alter the bet required and the probability to maintain the same expected value. For example, a first game loaded on a gaming machine from the server 214 may offer a 1% probability of winning a progressive award based on a $1 wager to be eligible for the progressive award. A second game loaded on another gaming machine via the server 214 which is eligible for the same progressive award may offer a 2% probability of winning the progressive award based on a $2 wager to be eligible for same progressive award. The probability of winning for the second game is thus 2% resulting in the same constant expected value between the first and second games. Of course other adjustments may be made to keep the progressive awards fair across different games. Likewise, other community based events may be linked to different wagering games which are sent to the gaming machine.

The server 214 in this example stores a number of wagering games in the storage device 230. In this example, the server 214 stores a set of instructions for a first wagering game 232 and a second set of instructions for a second wagering game 234 in the storage device 230. It is to be understood that part of the software to support the wagering games may already reside on the system memory 36 of the gaming machine. For example, the modules responsible for RNG, audio and/or video drivers, etc. may reside on the system memory 36 of the gaining machine. Other components of the instruction set of the game such as graphics files, audio files etc. may also reside in the storage device 230. Some or all of the instruction set may be loaded via the external I/O circuit 48 from the network 206 from the storage device 230 of the server 214. In this manner, the gaming machine may be used to play different games without requiring manual delivery of instructions sets of different games to the gaming machine.

Figure 4:
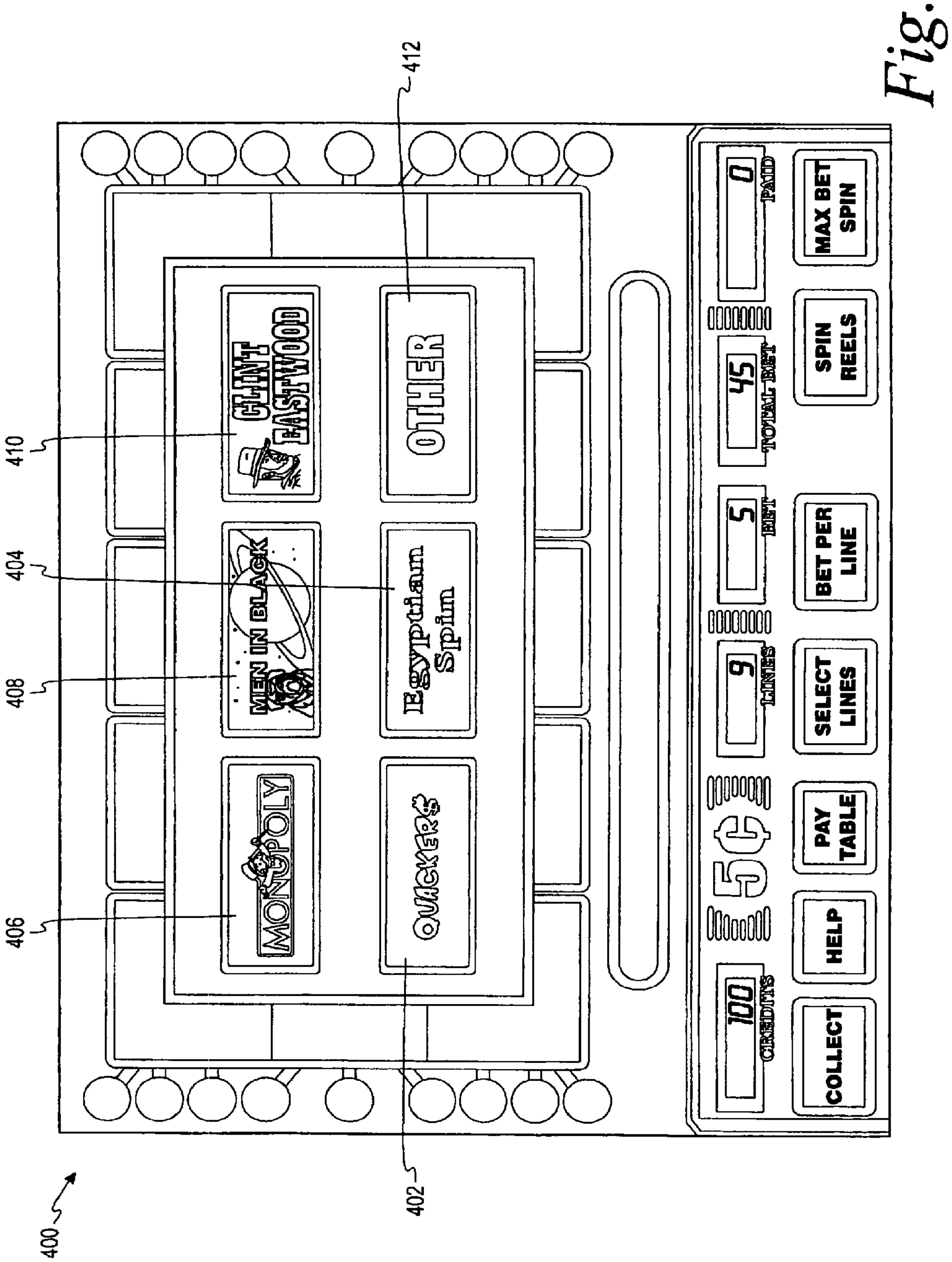
FIG. 4 illustrates a menu screen shown on the primary display of a gaming machine of FIG. 1*a* which is presented to a player offering a choice between different wagering games.

For example, a player may request a certain wagering game based on an initial display of a menu of wagering games displayed by the gaming machine. The menu may include some or all available wagering games stored on the server 214. FIG. 4 illustrates a menu screen 400 which may be displayed on the primary display 14 or the secondary display 16 as a default graphic or may be displayed after a period of gaming machine inactivity. Other background graphics and/or videos may be displayed on the primary display 14 or the secondary display 16 to attract players to the gaming machine. The menu screen 400 in this example gives a player a choice between playing four different wagering games including a gaming icon 402 representing the selection of the first wagering game 232 and another gaming icon 404 representing the selection of the second wagering game 234 and icons 406, 408 and 410 representing the selection of other wagering games. Of course, any number of game selections may be offered on the menu screen 400. Other menu screens may also be accessed via another icon 412. Alternatively, a player may be offered a choice of certain wagering games which are stored on the server 214 based on the popularity of wagering games or according to player information obtained from the player information reader 52. For example, a wagering game may be offered based on a player having spent more time playing the particular wagering game or if the wagering game is among a player's previous selected favorites. Based on the menu display 400, a player may select the desired game via a player input device such as the push buttons 26 or touch screen buttons 30. Further, an operator of the casino 202 may use the server 214 to load wagering games to different gaming machines based on popularity, location, time interval, special events, schedule, etc.

Figure 5:
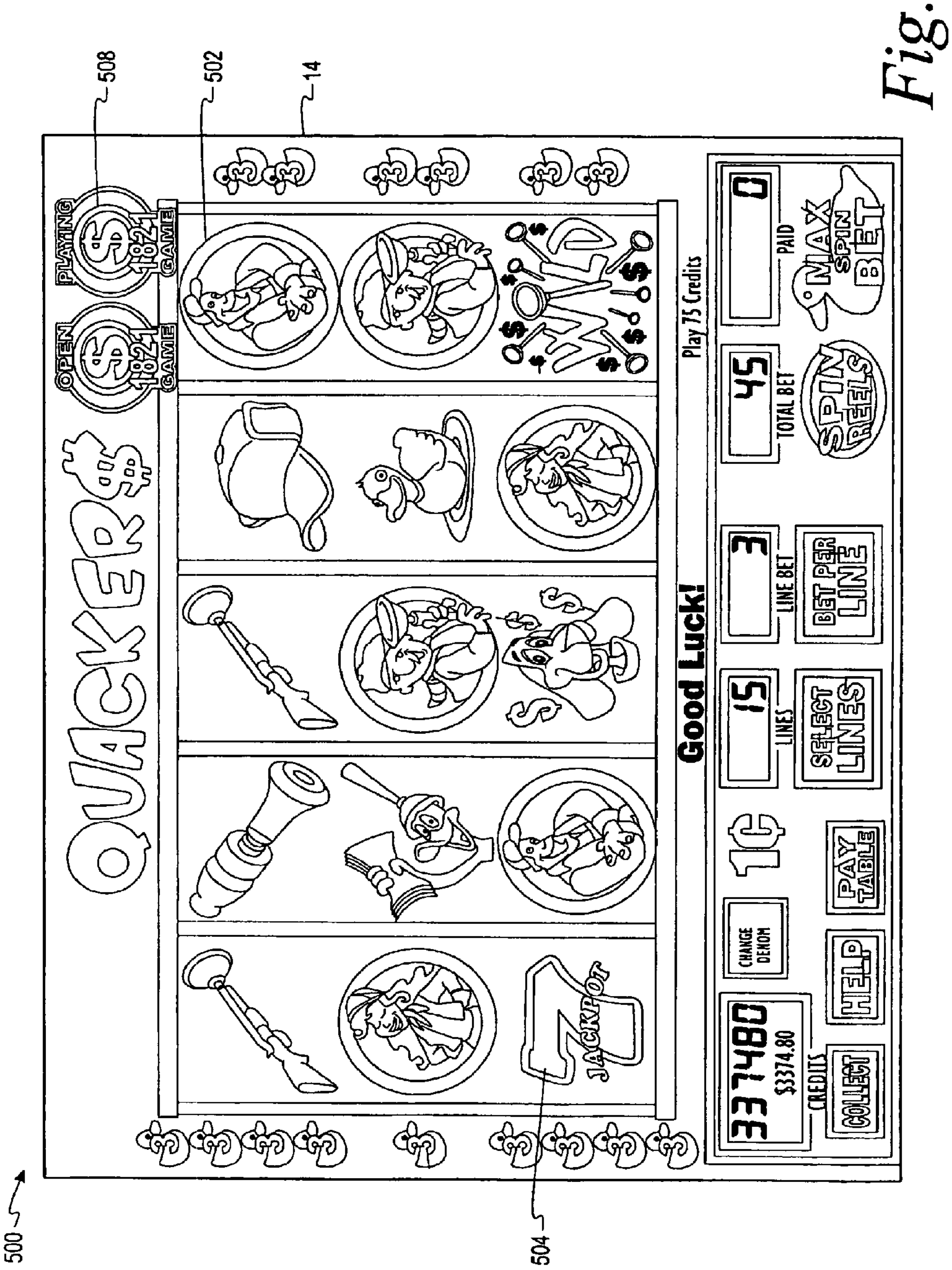
FIG. 5 illustrates the primary display of the gaming machine of FIG. 1*a* displaying the screen of a first game which is loaded from the network in FIG. 3.

In operation, when an instruction set of a wagering game such as the first wagering game 232 is received by the external I/O circuit 48 on the gaming machine, the instruction set of the game 232 is stored in the system memory 36. The first wagering game 232 in this example is a wagering game that produces a randomly selected outcome selected from a plurality of outcomes in response to receiving a wager input from a player via the player input device 24. For example, the wagering game 232 may enable the controller 34 to show a slot display 500 having a plurality of reels on the primary display 14 as shown in FIG. 5. The slot display 500 has a theme (i.e., "Quackers") designed to attract players and other game feature graphics. In this example, a certain combination of symbols 502 is enabled by wagering game 232 to indicate the randomly selected outcome and which may provide access to a community event. In this example, the community event may be a progressive award. Alternatively, the wagering game 232 may display a scatter symbol such as a special symbol 504 as an indication of the randomly selected outcome thus enabling the community event.

Figure 6:
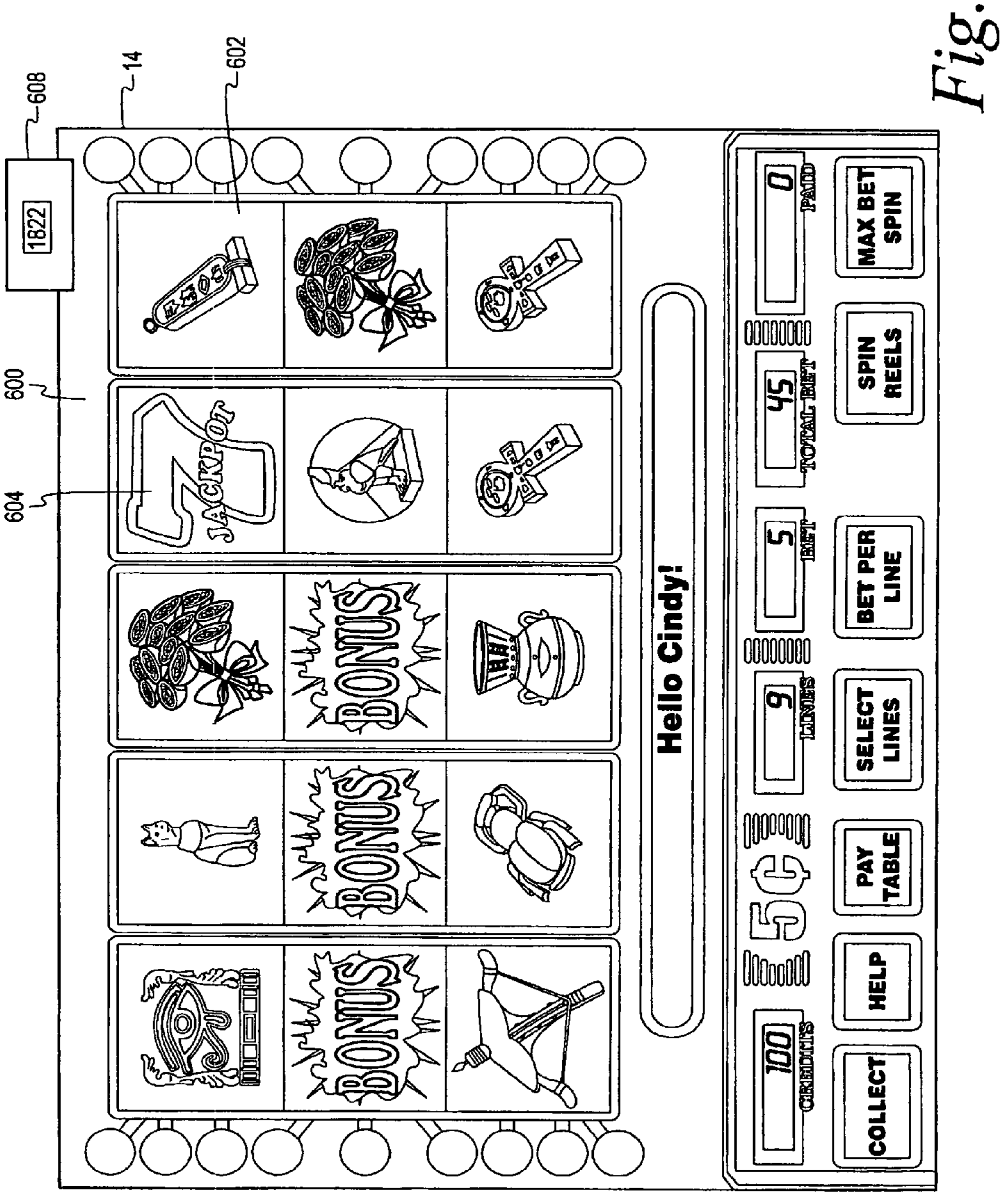
FIG. 6 illustrates the primary display of the gaming machine in FIG. 1*a* displaying the screen of a second game which is loaded from the network in FIG. 3.

As explained above, a second wagering game such as the second wagering game 234 may be loaded on the same or different gaming machine from the server 214 either via player request or on a command from an external device such as the server 214. As shown in FIG. 6, the second wagering game 234 in this example is a different wagering game from the wagering game 232 in FIG. 5. The second wagering game 234 has a distinct presentation screen 600 which differs in theme (i.e., "Egyptian Spin") and graphics from that of the first game 232 but is presented on the same or different gaming machine. In this example, the second game 234 is a wagering game with a slot display 600 having a plurality of reels as shown in FIG. 6. In this example, a certain combination of symbols 502 is enabled by wagering game 232 to indicate the randomly selected outcome and which may provide access to a community event. In this example, the community event may be a progressive award. Alternatively, the wagering game 234 may display a scatter symbol such as a special symbol 604 as an indication of the randomly selected outcome thus enabling the community event.

In one example, the progressive award is available to players of the first game 232 on the gaming machine 10 and the second game 234 on the gaming machine 210*a*. In this case, the same expected value for the progressive award is used for the first game 232 and the second game 234. Thus, the first game 232 offers a player the opportunity to place a wager to be eligible for the progressive award. The second game 234 will also offer a player the opportunity to place the same wager amount to be eligible for the progressive award. The probability of winning the progressive award is the same between the first and second games 232 and 234. In such a case, the games 232 and 234 may be preconfigured to provide access to a community event such as a progressive award. For example, the games 232 and 234 may be preconfigured to show the same symbol or symbols (i.e., symbols 504 and 604 in FIGS. 5 and 6) as an indication of the randomly selected outcome to award the progressive award. The same symbols may be used to offer players common, familiar features across different games. Of course a different symbol or symbols unique to each game may be used to indicate the randomly selected outcome.

Alternatively, the first game 232 may offer a player the opportunity to place a wager of a different amount to be eligible for the progressive award at a different probability to ensure the expected value of both the first and second games 232 and 234 are the same. For example, the first game 232 may offer a player a wager of $10 at a probability of 0.1%, while the second game 234 may offer a player a wager of $1 at a probability of 0.01% for the same progressive award.

Finally, the games 232 and 234 may be configured to display certain video symbols which include community event data. For example, the game 232 displays a symbol 508 in FIG. 5 which shows the value of a potential progressive award. In this example, the progressive award is available for all games being played on a bank of machines such as gaming machines 10 and 210*a-d*. Thus, the second game 234 displays a symbol 608 in FIG. 6 also showing the value of the same potential progressive award.

In addition, the second game 234 may be loaded on the gaming machine 10 in place of the first game 232 and continue to allow access to the same community events such as a progressive award as the first game 232. Of course both the first and second games 232 and 234 may allow participation in other progressive awards independent of those accessible via the other game.

Another configuration of the gaming system 200 allows participation in underlying community events to be independent of the wagering game loaded on the gaming machine. In such a case, a community event such as a progressive award is associated with the gaming machine. Regardless of the game loaded on the gaming machine, the community event will be determined (e.g., a contribution to a progressive jackpot or an award of the progressive jackpot) according to the gaming machine independent of outcomes of the loaded game. In this manner, the instruction set of the loaded game does not have to include any instructions relating to a community event.

For example, the occurrence of a progressive award may be triggered by a progressive controller such as the server 214. The progressive award is a result of contributions determined by the credits wagered by players on participating gaming machines. For example, for every time a gaming machine accepts a wager, the progressive controller increments the value of a progressive award (i.e., 1% of the credits wagered). Of course, the wager may be for any game loaded on the gaming machine. The eligibility for such a progressive award may be determined by a gaming machine function such as the number of credits wagered by a player. In such a case, the external interface 48 communicates to the network 206 that the gaming machine 10 is in operation. Prior to each use of the gaming machine 10, the controller 34 may select a number or numbers based on the number of credits wagered from a range of numbers. The progressive controller randomly selects a number from the range of numbers which is compared with the number or numbers allocated to the player. If a match occurs, the particular gaming machine may award all or part of the progressive award or switch over to an award game which allows the player to play for all or part of the progressive award.

Disassociating the community events from the games themselves serves as an opportunity to give control to the casino operator or player to make the choice as to which games they would like to play and which progressive awards or communal bonus events they would like to include. This may extend the product life of games by allowing players/operators the opportunity to control the product mix.

Figure 7:
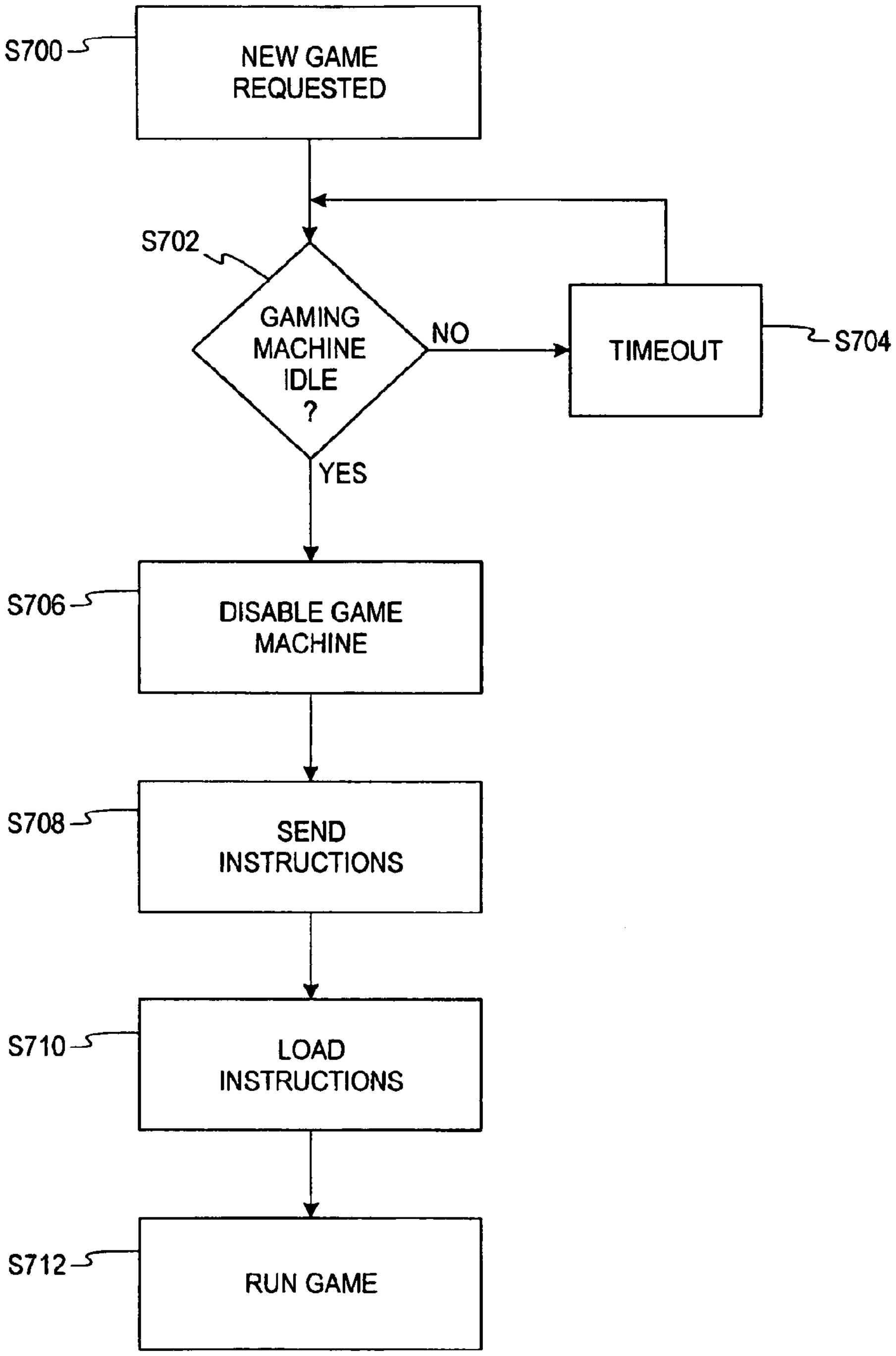
FIG. 7 is a flow diagram of the process to upload a game to the gaming machines in the gaming system of FIG. 3.

FIG. 7 is a flow diagram of the process for loading at least a part of the software for the wagering game in the gaming machine of FIGS. 1*a* and 2. In step s700, the server 214 determines whether a new game is requested. A new game may be requested via a player via the player input control and menu screen 400 shown on the primary display 14 on the gaming machine in FIG. 4. Alternatively, a specific event such as winning a basic game or other conditions may result in a request for a new game. Also, the wagering game may be loaded on a schedule determined in advance by the proprietors of the casino 202 to maximize playing certain popular games on the gaming machine at select times. In step s702, the server 214 determines whether the gaming machine is idle, i.e. not being operated by a player. If the gaming machine is not idle, the server 214 takes a timeout in step s704 and loops back to step s702.

If the gaming machine is idle in step s702, the controller 34 disables the gaming machine in step s706 and may display a notification graphic on the main display 14 indicating the gaming machine is waiting for a new game. The server 214 sends part or all of the software for the wagering game over the local area network 206 and to the external interface 48 in step s708. The software is received and loaded in the system memory 36 in step s710. The controller 34 then begins to run the loaded wagering game in step s712.

Although embodiments of the invention have been described with respect to a lottery game, the principles and teachings of the invention may be equally applicable to other types of wagering games.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming machine for playing a wagering game, comprising:

a storage device to store a first software instruction set for a first wagering game and a second different software instruction set for a second wagering game, the first wagering game including a randomly selected outcome selected from a plurality of outcomes in response to receiving a wager input from a player, the first and second wagering games each determining whether to provide access to a community event over the network, the community event having an award value;

a controller to select either the first or second wagering game, and adjust the probability of accessing the community event for the selected first or second wagering game or adjust the award value of the community event to produce an equalized expected value for the community event based on the adjusted probability or award value of the community event;

an interface coupled to the storage device and capable of communication with a network to receive at least a part of the instruction set for the selected first or second wagering game from the network, and accesses a locally stored part of the software instruction set for the selected first or second wagering game, wherein the controller executes the selected software instruction set in order to run the first or second wagering game; and wherein the selected wagering game determines whether to provide access to the community event over the network and awards the equalized expected value for the community event.

2. The gaming machine according to claim 1, wherein the community event is a progressive award and a portion of the wager input is for funding an amount of the progressive award.

3. The gaming machine according to claim 2, wherein at least part of the instruction set of the second wagering game is receivable via the interface from the network.

4. The gaming machine according to claim 1, wherein the access to the community event is triggered in response to a mystery event or an outcome displayed in theselected wagering game.

5. The gaming machine according to claim 1, wherein the selected wagering game detects the occurrence of the community event from the network and the occurrence of the community event is determined by a community event controller in communication with the network.

6. The gaming machine according to claim 5, wherein the network includes a community display which indicates the occurrence of the community event.

7. The gaming machine according to claim 1, further comprising a controller, wherein said network is a peer to peer network, the controller performing a network function.

8. The gaming machine according to claim 1, further comprising:

a player identification system for identifying said player;

a display; and wherein the player identification system causes the display to display an option to select the first or second wagering game to the player based on an identification of said player.

9. A method of distributing an instruction set for a wagering game to a gaming machine, the wagering game including a randomly selected outcome selected from a plurality of outcomes in response to receiving a wager input from a player, the method comprising:

storing at least part of a first software instruction set for a first wagering game on a network and at least part of a second, different software instruction set for a second wagering game, and storing part of the software instruction set for the selected first or second wagering game in the gaming machine, the first and second wagering games providing a player with access to a community event, the community event having an award value, the software instruction sets allowing a controller to run a wagering game when loaded and executed by the controller in the gaming machine;

coupling the gaming machine to the network;

selecting either the first or second wagering game, and adjusting the probability of accessing the community event for the selected first or second wagering game or adjusting the award value of the community event to produce an equalized expected value for the community event based on the adjusted probability or award value of the community event;

and loading the at least part of the software instruction set for the selected wagering game onto the gaming machine.

10. The method of claim 9, wherein the community event is a progressive award and a portion of a wager input funds the progressive award.

11. The method of claim 9, further comprising:

determining an occurrence of the community event on the network; and sending an indication of the occurrence of the community event to the gaming machine.

12. The method of claim 9, further comprising:

coupling a second gaming machine to the network; and loading the at least part of the instruction set of the first or second wagering game on the second gaming machine.

13. A gaming system for playing wagering games and providing access to a community event, comprising:

a network having a storage device to store at least a part of a first software instruction set for a first wagering game that provides a player with access to the community event and at least part of second software instruction set for a different second wagering game that provides a player with access to the community event, the community event having an award value; and a gaming machine coupled to the network and receiving the at least part of the software instruction set for either the first or second wagering game, the gaming machine storing part of the software instruction set for the selected first or second wagering game, the gaming machine allowing a player to operate the received wagering game, the gaming machine including a controller loading and executing the software instruction set in order to run the first or second wagering game; and wherein the probability of accessing the community event for the received first or second wagering game is adjusted or the award value of the community event is adjusted to produce an equalized expected value for the community event based on the adjusted probability or award value of the community event.

14. The gaming system according to claim 13, further comprising a community event controller coupled to the network to determine at least in part the occurrence of a community event.

15. A gaming machine comprising:

a storage device to store at least part of an instruction set for a first wagering game and a second wagering game;

a controller coupled to the storage device, the controller detecting the use of the gaming machine by a player;

an interface coupled to the storage device, the interface allowing the receipt of at least a part of a first software instruction set for a first wagering game having a plurality of outcomes and allowing access to a community event, the community event having an award value, and allowing the receipt of at least a part of a second software instruction set for a second different wagering game allowing access to the community event from a network;

wherein the community event including a community bonus game is provided to the player as a function of the use of the gaming machine and independent of the wagering game played at the gaming machine, and wherein the player and at least one other player at another gaming machine coupled to the network participates in the community bonus game; and wherein the probability of accessing the community event for the wagering game is adjusted or the award value of the community event is adjusted to produce an equalized expected value for the community event based on the adjusted probability or award value of the community event.

16. The gaming machine according to claim 15, wherein at least a part of a second instruction set for a second wagering game is received via the interface.

17. The gaming machine according to claim 15, wherein the network is a server based network or a peer to peer network.

18. The gaming machine according to claim 15, wherein the community event is operated by an external controller of the network.

* * * * *

UNITED STATES PATENT AND TRADEMARK OFFICE

CERTIFICATE OF CORRECTION

PATENT NO. : 8,758,123 B2
APPLICATION NO. : 12/442503
DATED : June 24, 2014
INVENTOR(S) : Christopher J. Frattinger and Michael W. Mastropietro It is certified that error appears in the above-identified patent and that said Letters Patent is hereby corrected as shown below:

In the Claims

On Column 19, Line 31 (Claim 4, Line 3), please delete "theselected" and insert -- the selected --, therefor.

Signed and Sealed this
Thirtieth Day of September, 2014

Michelle K. Lee

Michelle K. Lee
*Deputy Director of the United States Patent and Trademark Office*